Figures 1, 2:
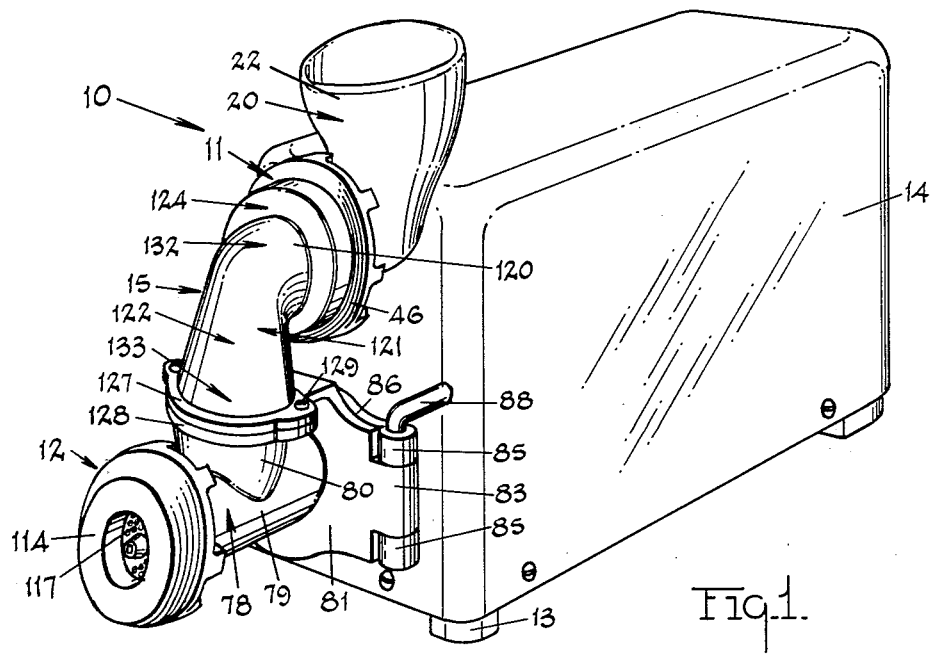

May 22, 1962 V. G. BIRO 3,035,622
COMPOUND MEAT CHOPPER
Filed Sept. 14, 1959 2 Sheets-Sheet 1

INVENTOR.
Vincent G. Biro
BY
Jeaman Crampton
ATTORNEY

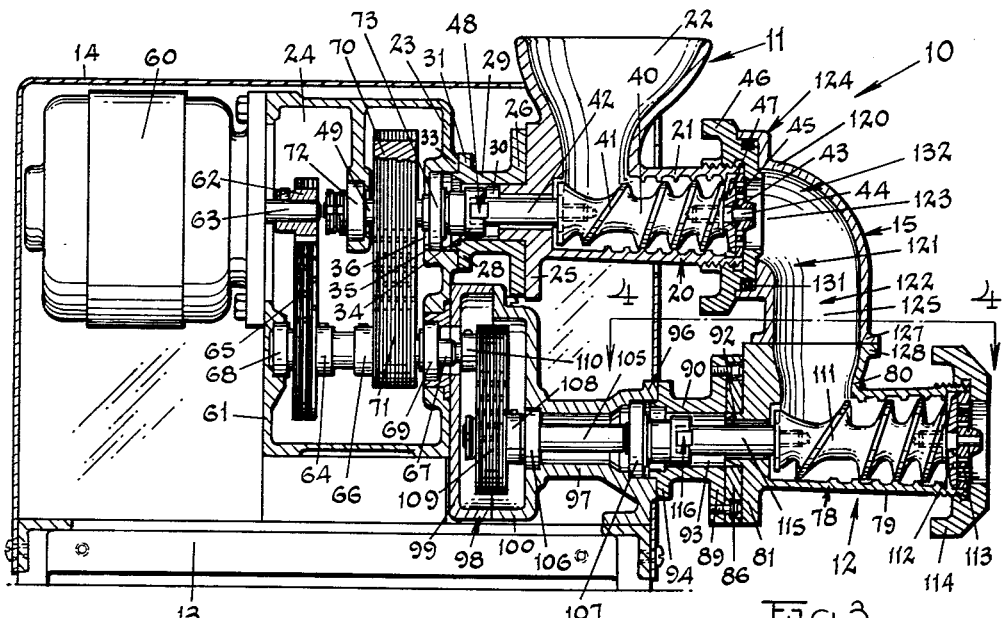

United States Patent Office 3,035,622
Patented May 22, 1962

3,035,622
COMPOUND MEAT CHOPPER
Vincent G. Biro, Marblehead, Ohio, asignor to The Biro Manufacturing Company, Marblehead, Ohio, a corporation of Ohio
Filed Sept. 14, 1959, Ser. No. 839,664
10 Claims. (Cl. 146—182)

This invention concerns the comminution of materials, particularly, food materials such as meat which, when divided into small particles, forms that which is conventionally known as "ground or chopped meat." By disclosure here, my invention purposes to teach the art how to construct a machine and conduct a method by which meat, particularly, frozen or fresh chunk meat, may be more efficiently converted into the so-called "ground or chopped meat."

The invention, in summary, resides broadly in an arrangement of means and elements, including those elements comprising such means, and of steps in a method whereby, in an operation subjecting materials, in a single pass, to successive reducings or grindings, material in the stage of the subsequent reduction or grinding is manipulated so as to prevent the development of back pressure on the material in the first or earlier stage of reduction or grinding in a manner and with means that is simple, compact and of low installation and maintenance cost.

In so far as my invention concerns particular structural details, it resides, in summary, in an arrangement of successive and conveyor connected meat grinding or chopping machines having a relation in size and elements by which the ground or chopped meat has the opportunity and space into which to expand and to flow through and during successive grinding and mixing operations. In particular method details, my invention, in summary, includes the steps of allowing ground or chopped meat to freely fall through space of an increasing dimension progressively with the fall in passing from one grinding or chopping station to a successive grinding or chopping station, and thus to exert in effect, a back pressure reducing draft on the meat at the first grinding or chopping station.

In the current era of merchandising, particularly foods, the trend is in the direction of prepackaging. This is increasingly exhibited in the special field of meat merchandising. Prepackaging meat enables the merchandiser to more efficiently use the time of his meat processing employees and machines by effecting a mass processing and packaging of each meat product at one time. Also, where the product is a consequence of blending, as is chopped meat a consequence of blending lean and suet meats, a more uniform and standard quality is obtainable when the product is made in large quantities at one time. However, to anticipate the needs of customers for a period, as say a day, and to process sufficient meat for that period, presents problems that are not within the capacity of most meat processing machinery in current use.

This inadequacy of current meat processing machinery exists particularly in the field of meat grinders or choppers. Machines of this character, in current use, are not only inadequate to cope efficiently with the mass of meat which must be prepared in anticipation of a day's merchandising but also such machines are unprepared to deal with the currently used frozen, semi-frozen or chilled meat in chunk form and texture of the meat that is fed to the machines for reduction. To meet this need is one of the primary objects of my invention.

Among some users of meat chopping equipment currently available, it has been the practice to pass the meat to be ground and the meat already ground repeatedly through a single chopper, thus, in the hope of obtaining not only a desired degree of meat grinding fineness but also a preferred optimum of mixture blending as between the lean meat fibre and suet portions thereof. Such an operation requires, in the repeated feeding of the discharging chopped meat, considerable handling by the machine operator and extends the production time sometimes to an undesirable and uneconomical extent. It is, therefore, another important object of my invention to provide meat chopping equipment in which such operator handling and repeated passing of the meat is entirely eliminated, without any sacrifice but instead with a considerable improvement in the meat chopping fineness obtained and the adherence in blending to a preferred mixture optimum.

Still another object of my invention is to provide a plurality of meat chopping stations in a series or tandem arrangement having meat chopping instrumentalities at each station. I realize that certain of my predecessors, to a limited extent, broadly suggest series or tandem arrangements of meat grinding or chopping machines. However, in the instances of which I am aware, these have been of the kind in which the lead meat grinder discharges directly to an endwise disposed and axially aligned follower meat grinder or to one closely adjacent and in a parallel extending relation to the lead meat grinder.

These prior art processors, as a consequence of the arrangements just described, tend to build up high back pressures in the meat being ground particularly in the lead grinding station, and thus materially reduce the operating efficiency of the whole installation as well as often causing quality destroying heat to be generated in the meat mass. In constructions embodying my invention, another object of my invention, that is the prevention of a development of such back pressure and its resultant development of quality affecting heat, is attained.

In this last connection, my invention has for a particular object to provide a conveyor conduit between the lead and subsequent meat chopping instrumentalities that allows the ground and chopped meat an opportunity and space in which to expand following its passage through the first cutting. Also in the same connection, my invention has for another particular object to provide a conveyor conduit between the lead and subsequent meat chopper stations that provides space in which the meat cut in the first chopping, falls of its own weight, a distance before entering the second chopping station or the instrumentality positioned there, producing thereby a draft of the chopped meat in a direction opposite to that favoring the creation of a back pressure on the meat at the lead station.

My invention has for a further particular object to provide meat chopping equipment having multiple meat chopping stations that may be speedily converted from multiple station chopping to single station chopping and vice versa.

A still further and more particular object of my invention is to provide advantageous structures, arrangements and steps which will appear from the following description and from an examination of the accompanying drawings.

Meat choppers containing my invention or performing steps in the method of meat chopping and cutting taught by my invention may take various forms, of which one, now appearing to me to be the best mode of carrying out my invention, is described hereinafter and shown in the accompanying drawings. By making such description and in alluding to the drawings during the course thereof, however, I do not imply that I am unaware that there are variations from the structures being described or shown which also embody my invention nor do I thereby disclaim such variations as beyond the contemplation of my invention as hereinafter made manifest.

The drawings, to which I make reference, are:

FIG. 1, which is a perspective view of a compound meat chopper embodying the features of this invention;

FIG. 2, that is a front elevational view of the machine shown in FIG. 1;

FIG. 3, which is a vertical sectional view taken along the plane of the line 3—3 shown in FIG. 2;

FIG. 4, that is a horizontal sectional view taken along the plane of the line 4—4 in FIG. 3; and FIG. 5, which is a front view similar to that of FIG. 2 wherein certain of the machine parts are illustrated in an alternative position to that shown in FIG. 2.

The machine 10, of the compound meat chopper shown in the accompanying drawings, will be formed to generally include a primary or lead meat chopper unit 11, a secondary or subsequent meat chopper unit 12; both units being operatively mounted in supported association on a structural base 13 and in reference to a case 14. As will be more specifically herein set forth, the lead chopper unit 11 and the follower chopper unit 12 are interconnected according to the improved structures of my invention by a conveyor 15 through which the chopped meat stream flows from one unit to the other in a substantially free-falling manner. This very much reduces the possibility of the chopped meat restraining subsequently chopped material from emerging from the first unit; likewise eliminating the creation of back pressures in the lead unit, and additionally enabling the falling mass and parts thereof to more intimately intermingle in the follower unit thereby achieving a more desirable mixture of meat thereof, such as of meat fibers and fat portions.

*The Primary or Lead Chopper Unit*

With reference now to the drawings, the lead chopper 11 will be seen to include a bowl 20 of the well known form having an axially horizontal tubular body 21 and an integral upwardly opening feeding hopper 22. The bowl 20, at its inner end, is carried on a wall 23 of a gear box 24. For this purpose, said inner end of the bowl 20 is shaped to have an annular flange 25 and a short axial hub 26. The flange 25 is attached, as by suitable bolts, to an opposed facing flange 26 of a tubular bowl holder 29; the hub 26 being fitted into a central base 30 of such holder. In turn, the holder 29, at its flanged end 31, is attached as by bolts to an outwardly directed surface of a boss 33 formed in the gear box wall 23. Similarly, the flange end 31 connects with an axial hub 34 interfitting with an annular wall of a counterbored recess 35 in the boss 33. The recess 35 is in communication with the interior of the gear box 24 by means of an opening 36 of reduced diameter. Thus, opening 36, the recess 35 and bore 30 afford, in their mutual alignment, a passageway in which the source of power for a worm 40 is located. The worm 40 is contained within the heretofore mentioned tubular body 21 of the bowl 20.

This worm 40 has a typical thread formation 41, adapted to engage meat portions introduced into the bowl 20 through the hopper 22 and to urge the meat forwardly of the bowl, as the worm is rotated. Thus, the worm, at its inner or one end is equipped with a drive shank 42 and at its opposite or outer end has a squared shank 43 terminating in an annular tip 44. The tip 44 is journaled in a reticulated plate 45 that is seated in a counterbored end of the bowl body 21 and retained therein by means of a ring nut 46. A cutter plate 47 carried on the square shank 43 and being interposed between the end of the worm 40 and the reticulated plate 45 serves, as the meat material is urged by the worm 40 toward the plates 45 and 47, to reduce the meat material into suitably small particles that are then extruded through openings 50 in the plate 45, as succeeding amounts of meat being carried forwardly through the bowl 20 by the worm 40 approach the plate 45. The openings 50 are all of equal size and are substantially equally distributed in spaced relation in the plate 45.

The worm 40 is positively driven by the drive shank 42 through a releasable chucking arrangement indicated at 48 connecting the shank with a powered shaft 49 of a source of power now to be described.

*The Source of Power*

The powered shaft, journaled in bearings 72 and 73, constitutes the output power source by which the worm 40 is positively driven, which power originates in an electric motor 60. Essentially, the motor 60, secured to a rear wall 61 of the gear box 24, is equipped with a motor shaft 63 having a pinion 62 thereon. The pinion 62 is coupled to a gear wheel 64 by means of an endless drive chain 65. The gear wheel 64 and a second gear wheel 66 are fixedly mounted on a shaft 67 journaled at its ends in bearings 68 and 69 suitably supported on the walls 23 and 61 of the gear box 24. For reasons to be more fully described, the shaft 67 is extended through its bearings 69.

In order to controllably reduce the rate of rotation developed by the motor shaft 63, the ratio between the diametric pitch of the pinion 62 and the gear wheel 64 is such that the shaft 67 is driven at a materially slower rate of speed. By determining the optimum rate of rotation at which the worm 40 is to be driven, the diametric pitch of the gear wheel 66 is selected in relation to a gear wheel 70 keyed to the powered shaft 49 and which it drives through the endless gear chain 71.

The above described structure and operation is relatively of common knowledge. Presently employed meat chopper machines are of the character herein so far described but these, as has been before mentioned, are quite limited in their productive capacities to preparation of ground or chopped meats in a single chopping operation.

In order to obtain a finer comminution of the meat and to create a better intermixture of the meat fibers and fats, the meat material, in the machines in present use, must again or successively be passed through the single chopper unit. Obviously, this impairs the desired rate of productivity and without insuring the best quality of chopped meat as determined by the texture and appearance of the finished material. Accordingly, to eliminate the repetitive and time consuming passing of the meat through a single unit, the use of aligned or tandem chopping units has been contemplated; the second unit immediately receiving the ground substances from the first unit. These suggested structures have been found to be inadequate in actual use by reason of the discovery that the meaty particles in being extruded from one unit toward the other actually impact upon each other; tend to clog any passageway therefor and ultimately produce objectionable back pressures to greatly reduce or impair the effective utility of the primary chopping source. To gain a solution from these deficiencies found in prior meat or produce chopping machines, I have found that the continuous chopping of such materials can be best achieved by superimposing one chopping unit in alignment with and above the other thereby eliminating any direct movement of materials therebetween while obtaining the desired result of double chopping in a single, continuous productive operation. By the use of such a structural relation, I have also devised a directive conduit, the conveyor 15, so formed that the thread-like formation of the extruded meaty particles tend to intermix, while freely falling and before being subjected to the immediately occurring second chopping operation. This continuous and unimpeded discharge of the chopped material, from the first chopping unit, also greatly reduces, if not completely eliminates, any possibility of the generation of back pressures within the bowl body 21 in the vicinity of the discharge end.

*The Second Chopper Unit*

The embodiment of the second or follower chopper unit 12, herein disclosed, includes, like the lead unit 11, a horizontally disposed bowl 78 having a tubular bowl body 79, like the bowl body 21, surmounted by a hopper 80 that is of a form that is a slight modification of the form of the hopper 22. Bowl 78, at its rearward end, is formed with an integral flap plate 81 that is provided at its opposite ends with lugs 82 and 83 having vertically directed conical passageways therein. Each lug 82 and 83 is adapted to be received between a pair of vertically spaced ears 84 and 85 extended outwardly from a mounting plate 86. The pairs of ears 84 and 85 are provided with aligned openings which register with the passageways in the lugs 82 and 83. This creates, for purposes of supporting the bowl 78 to be hereinafter more fully discussed, a form of hinge block relation which is established through the use of tapered pins or pintle members 87. For convenient use of the pins 87, they are each formed with a handle portion 88, which, as herein shown, is bent angularly with reference to the major axis of each pin.

The mounting plate 86 is secured to the flanged end of a bowl holder 90 by means of suitable bolts, in a manner similar to the securement of the flanged end 25 of the bowl 20 on the holder 29. Also, the flap plate 81 is equipped with an axial hub 92 aligned with a bore 93 in the holder 90. In this instance, the bowl holder 90 has an opposite flanged end 94 secured, as by bolting, to a mating flanged end 96 of a tubular portion 97 of an auxiliary gear casing 98. The casing 98, as viewed in FIG. 3, is formed by a component mounting member 99 and a cover member 100 from which the tubular portion 97 integrally and horizontally extends. The members 99 and 100 of the casing may be fixedly mounted on the forward wall 23 of the heretofore mentioned gear box 24, as by bolts 101. Within the casing 98, a shaft 105 is journaled in bearings 106 and 107 suitably mounted in the opposite ends of the tubular portion 97. At its inner end, the shaft 105 is fitted with a gear wheel 108. The gear wheel 108 is, by means of a gear chain 109, operatively associated with a pinion wheel 110 fixed on the end of the shaft 67, which, as previously described, extends through the bearings 69. Hence, when the motor 60 is operated to drive the worm 40, the shaft 105 will also rotate, at a rate according to the proportionate pitches of the gear 108 and pinion 110.

Rotation of the shaft 105 is utilized to drive a worm 111 within the bowl body 79 at the second chopper station. The worm 111 is similar in form and functional respects to the worm 40 in the lead chopper unit and carries, on one end, a cutter plate 112 which is adapted to perform the cutting action in rotating in close proximity to a reticulated plate 113. Likewise, as in the instance of the worm 40, in its relation to the plate 45, the tip end of the worm 111 is journaled in the plate 113 which is contained within a counterbored end of the bowl 78 by a ring nut 114. The inner end of the worm 111 is operatively driven by an extension shaft 115 connecting with the shaft 105, as through a key chuck connection, indicated generally at 116.

The worm 111 and tubular bowl body 79 differ from their counterparts 40 and 21 at the lead station, however, by having greater effective cross-sectional areas or bore dimensions than the effective bore dimensions of the worm 40 and bowl body 21. This is provided because, when, at the lead chopper station, the unchopped meat is introduced, through the hopper 22, the meat is usually in the form of chunks, sometimes frozen, and very compact and therefore occupying only a small space per unit of meat mass. As the chunks pass through and are subjected to the chopping action in the lead unit 11, some melting, if the meat was frozen, and swelling thereof, takes place and the surface area of the meat forming the chopped charge becomes, by reason of meat division, greatly increased. The space displacement of the chopped meat, per unit of mass, grows as a consequence. In contemplation of this phenomena, the tubular bowl body 79 as the follower chopper station is greater in size thus to absorb the meat discharged from the lead chipper unit. I have found that the follower bowl body 79 should be larger in diameter than the lead bowl body 21 by a factor of between thirty-five to forty-one percent, if the follower bowl body 79 is not to choke up or to be, by reason of its inadequate space to absorb the chopped meat emanating from the lead station, a cause for generating back pressure on the meat passing through the lead station unit 11.

In the form shown in the accompanying drawings, the bowl body 79 has an effective diameter of about thirty-five percent greater than the effective diameter of the lead station bowl body 21. Consequently, the worm 111 is also of greater effective diameter, by a like amount, as are the cutter and reticulated plates 112 and 113 mounted in the end of the bowl 78.

Openings 117 in the reticulated plate 113, like openings 50 in the plate 45, are all of equal diameter and substantially equally distributed across the area traversed by the plate 113. The openings 117 are also equal in diameter to the openings 50 in plate 45 but are in greater number than the number of openings 50 by a factor of between twenty-four to thirty percent. This presents a greater total open area at the discharge end of the bowl body 79 by a like factor and serves to facilitate the free or less restricted flow of the meat from the follower bowl body 79. By so allowing a free or less restricted meat flow from the follower bowl body, the generation of pressure therewithin and the transmission of its undesirable effect back to the lead chopper unit 11 is decreased.

So also the proportionate diametric pitches of the gear 108 and pinion 111, which drive the worm 111, may be either substantially of the same ratio as those of the gear 66 on shaft 67 and the gear 70 on shaft 49 that drive the worm 40 or, in order that the worm 111 of the chopper unit 12 will be driven at a comparably greater rate of speed to that of the worm 40, it is entirely within the scope of this invention, to vary the diametric pitches between the gear 108 and pinion 111. This, I have found, may be advantageous because by adjusting the diameter of the gear 108 to the diameter of the pinion 111, the worm 111 may be driven at a more rapid rate of speed than the worm 40, since the chopped meat and the tissues thereof passing through said second station unit 12, quite apparently, will have been initially cut and chopped up to some extent in the first unit 11 and consequently offer less resistance to the worm and cutting action. Rotation of the worm 111 at this higher rate also produces better intermixture of the meaty substances, one of the objectives of a machine embodying my invention.

*The Conveyor*

When assembling the follower chopper unit 12 into its operative position relative to the lead station unit, the lugs 82 and 83 of the plate 81 are inserted between the spaced pairs of ears 84 and 85 of the mounted plate 86. This relation of the plates 81 and 86 is completed by manipulation of the handles 88 to locate the pintles 87 in the then aligned apertures of the respective lugs and ears and thus to position the conveyor 15, between the discharge end of the chopper unit 11 and the vertically open hopper 80 of the second chopper unit's bowl body 78. The conveyor 15 is substantially formed as a hollow elbow, having horizontally disposed relatively short upper leg 120 on one side of a crotch 121, and an integrally associated vertical leg or stack portion 122 extending from the other side of the crotch. A passageway 123, of a substantially constant cross-sectional area throughout its length and equal substantially to the cross-sectional area of the tubular bowl body 21, extends from an open end 124 of the short upper leg 120 to the zone of the crotch 121 where it merges with a passageway 125 within the stack leg portion 122. At its lower end 127, the stack portion 122 is suitably flanged, to register in agreement with a flanged upper end 128 of the hopper 80 and to be fixedly secured thereupon by bolts 129. End 124 of leg 120 is adapted to register with an annular peripheral shouldered surface 130 formed in the ring nut 46. This affords a relatively separable relationship whose advantage will shortly be made evident. To effectively seal the adjoining surfaces between the conveyor end 124 and the ring 46, a groove may be provided in the annular surface 130 to receive a resilient "O-ring" 131 therein. This not only substantially seals the relatively loosely fitting union of the conveyor 15 to the ring 46 but also absorbs any operational vibrations therebetween and in consequence eliminates objectionable and incidental machinery noises while enabling the chopping machine to be equally employed in single or double chopping operation.

This facility is illustrated in FIG. 5, where the chopper unit 12 is shown in an angularly open inoperative position, with reference to the bowl holder 90 and to the chopper unit 11 of the lead station. Under such circumstances, the handle 88 of one of the pintle members 87 has been withdrawn from one set of the engaged lugs and ears while the other pintle member 87 of the opposite handle 88 is employed to pivotally support the second unit 12 for a swing movement out of operation and registration with unit 11. Since there is no mechanical difference between the arrangement or hinged relation of the lug 82 and ears 84 and 85 or the lug 83 with its respective ears, the unit 12 can be selectively swung out of the way in either direction from either side of the machine. This is noticeably of importance in view of the fact that, when commonly employed, meat choppers are usually placed on available shelves or counters where one or the other side of the machine may be in close proximity to a building wall or partition, limiting the choice of swinging the unit 12 to one or the other direction only.

Another important aspect of the conveyor 15 of my invention resides in the fact that passageway 125 in stack leg portion 122 thereof, has a cross-sectional area that is of an increasing dimension progressively in the length of the stack leg portion 122 from the point it originates in the zone of the crotch 121 to its terminus near the end 127. In addition, as the passageway 125 approaches its terminus near the end 127, it becomes somewhat eccentric to its major longitudinal axis and tends in a direction to one side of a position astride the worm 111, preferably to the side which is in lead to the direction of expected rotation of the worm 111.

These structural features assure, first, that the chopped meat, exiting from the lead station unit 11, will have space into which to fall freely and will not tend to become hung up and thus clog the passageway from the lead chopper station. By reason of such, back pressure on the lead station chopper will be avoided. In addition, the free falling meat particles, in passing continuously into the ever increasing space provided by the stack leg passageway 125, has room in which to mix and blend, preparatory to being subjected to further chopping operations at the follower chopper station unit 12. This greatly enhances the quality of the resultant chopped meat product produced after passage through the unit 12.

Upon examination of the conveyor 15, particularly as shown in FIGS. 2, 3 and 4, these features are shown embodied in the provision whereby a circular section 132 (FIGS. 2 and 3) of the passageway 123 in the leg 120 and particularly the end 124 thereof are substantially concentric with the axis of the bowl body 21. On the other hand, the passageway 125 in the stack leg portion 122 becomes as it extends therealong, enlarged an oval in cross-section, as at 133 (FIG. 2). Inner opposite curvilinear surfaces 134 and 135 of the passageway 125 (FIGS. 3 and 4) are spaced from each other a distance substantially equal to the inner diameter of the passageway 123 of the mentioned circular section 132 of the passageway 123. However, the thereto intermediate rounded inner end curvilinear surfaces 136 and 137 of the passageway 125 (FIG. 4) are spaced at progressively increasing distances from each other along the length of the passageway 125 beginning at a point in the region of the crotch 121, where the spacing is equal to that between surfaces 134 and 135, to a point in the region of the end 127, where the spacing is greater by a factor of between forty and forty-eight percent. This oval characteristic is also to be noted in the formation of the walls of the hopper 80 that mate with the conveyor end 127.

In accordance with this developed generation of the inner passageway surfaces of 136 and 137 of the stack leg 122, there is provided a definitely downward funnel effect of increasing magnitude thereby affording an increasing volumetric area into which the chopped meat, entering at the upper end of the conveyor 15, will initially fall freely in continuous thread formation to spread out, collide, merge and unavoidably become intertwined, as is greatly desired, since in so doing, the chopped tissues or fibers and fatty particles become thereby naturally and haphazardly intermixed. Accordingly, upon entering the hopper 80 preparatory to the second grinding operation, the mixed quality of the ground meat will be already benefited. Essentially, this improved formation of the conveyor 15 by causing the discharged meat to fall away from the discharge end of the bowl 20, also lends itself, as has been before mentioned, to a reduction in the development of back pressures which would ordinarily become pronounced in the discharge end of the bowl body 21, thereby undesirably reducing the cutting efficiency of the first chopper unit 11.

It will be noted that the rounded inner surface 137, particularly as it approaches the terminus of the passageway 125 in the region of the end 127 and the hopper 80, becomes eccentric to the major longitudinal axis of the passageway 125 and its opposite surface 136. The surface 137, instead, extends outwardly from said axis and more to one side of the axis of rotation of the worm 111 than the inner surface 136 extends. This, as FIG. 4 shows well, tends to direct the chopped meat from the chopper station unit 11 into a space, indicated 138 in FIG. 4, ahead of the direction of rotation of the worm 111. By such provision, the charge of chopped meat from the lead station unit 11 will be introduced to the worm 111 of the follower chopper station unit 12 at a most favorable position to the continued flow of the chopped meat and to the uninterrupted rotation of the worm 111.

*The Method*

The apparatus described above will, in operation, carry out the method of reducing meat taught by my invention, as equally well as can be done by hand or by other apparatus than that described herein. Such method comprises the primary steps of compressing and then dividing the meat into a plurality of pieces such as is accomplished when the meat passes through the lead station chopper unit 11.

Following such steps of compression and division, the meat pieces being treated in accordance with my invention, are confined and guided into a space allowing the pieces to freely fall and expand during the falling. These latter steps may be effected in an apparatus such as the conveyor 15 provides. During this procedure, the meat pieces are allowed to effect their natural space displacement and thus, when commingled with other meat pieces, mix well and easily in the subsequent operations, such as those taking place in an apparatus like the second chopper unit 12.

Mixing and further division of the meat particles comprise the final steps in my method. These steps as has been pointed out above, may be advantageously performed in apparatus like that provided in the chopper unit 12. The product resulting from using the method taught by my invention is of high quality because of the resulting blend of tissue and fatty or suet meat portions.

Thus, those skilled in the art will appreciate that my invention provides an apparatus and method by which meat may be efficiently chopped and, when so divided, mixed thoroughly and desirably with a minimum of operator handling. The apparatus of my invention also lends itself to adaptability of fitting almost any sort of installation and to being quickly modified from single to compound chopping operation. The simplicity and ease with which the apparatus may be assembled and disassembled permits cleaning and maintenance operations to be effected quickly and at exceedingly low cost. The arrangement of parts is compact and efficient giving the apparatus an attractive functional appearance.

I claim:

1. In a meat chopper adaptable for selective single and dual meat chopping during a single pass of meat through the meat chopper comprising, in combination, a base, a cylindrical meat chopper bowl having a discharge opening, means in engagement with the bowl and base adapted to support the bowl on the base, a worm, means in engagement with the worm and bowl adapted to support the worm in and for rotation relative to the bowl, actuatable means on and rotatable relative to the base and in engagement with the worm adapted, when actuated, to rotate the worm in a direction such that meat in the bowl will be moved toward the bowl discharge opening, a second cylindrical meat chopper bowl having a receiving opening, a second worm, means in engagement with the second worm and second bowl adapted to support the second worm within the second bowl and for rotation relative thereto, and a conveyor conduit in engagement with the second bowl and having one end in sealed communication with the receiving opening of the second bowl and the other end open; the provision of means to mount the second bowl on the base for selective operative and non-operative cooperation of the second bowl and worm with the first bowl and worm and comprising a bearing part in engagement with the second bowl, and an element in engagement with the base and the second bowl bearing part adapted to support the second bowl on the base and for movement relative to the base and to the first bowl to and from positions in one of which positions the open end of the conduit engages the first bowl in substantially sealed communication with the discharge opening thereof, thereby to receive ground meat discharged therefrom and to convey the same to the receiving opening of the second bowl.

2. In the meat chopper described in claim 1, the provision, in addition, of actuatable means on the base and rotatable relative thereto adapted, when the second bowl is in the heretofore described position of its mentioned positions, to engage the second worm and thus, when actuated, to rotate the second worm.

3. In the meat chopper described in claim 2, the provision, in addition, of a power means on the base in operative connection with both mentioned actuatable means.

4. In the meat chopper described in claim 1, the provision, in addition, of a second element in disengageable engagement with the base and second bowl and adapted, when engaging the base and second bowl, to lock the second bowl in its heretofore described position of its mentioned position.

5. In the meat chopper described in claim 1, the provision in which the bearing part is a journal, and the element is a pintle which extends through the journal to support the second bowl for pivotal movement relative to the base.

6. In the meat chopper described in claim 5, the provision, in addition, of a second journal and a second pintle, the second journal being on the second bowl with its major longitudinal axis in spaced parallel relation to the major longitudinal axis of the first mentioned journal, and the second pintle element being in withdrawable extension through the second journal and in disengageable engagement with the base and adapted, when engaging the base and second journal, to lock the second bowl in the heretofore described position of cooperation with the first bowl.

7. In the meat chopper described in claim 6, the provision in which the first mentioned pintle element is withdrawable from the first mentioned bearing part journal whereby the second bowl may be pivotally supported on the base by means of the second mentioned pintle and journal.

8. In the meat chopper described in claim 1, the provision in which the conduit is an elbow member having one leg longer, the longer leg being at the one end of the conduit engaging the second bowl, the longer leg enclosing a vertically extending passageway beginning at the crotch of the elbow and extending downwardly to the second bowl and being of an increasing cross sectional dimension throughout its entire length from crotch to end.

9. In the meat chopper described in claim 1, the provision, in addition, of means in engagement with one and adapted to make disengageable engagement with the other of the mentioned conduit in the region of its open end and the first mentioned bowl in the region of its discharge opening, when the second mentioned bowl is in the described position of its mentioned positions, whereby the conduit end and the discharge opening of the first mentioned bowl are brought into substantially sealed communication.

10. In the meat chopper described in claim 9, the provision in which the last mentioned means includes a resilient O ring in engagement with the first mentioned bowl and disposed in surrounding relation to the discharge opening therein, in a position to be engaged by the conveyor conduit open end.

References Cited in the file of this patent

UNITED STATES PATENTS

| | | |
|---|---|---|
| 303,482 | Baker | Aug. 12, 1884 |
| 800,452 | Kohn | Sept. 26, 1905 |
| 840,041 | Capener et al. | Jan. 1, 1907 |
| 2,006,318 | Schmidt | June 25, 1935 |
| 2,042,161 | Satzinger | May 26, 1936 |
| 2,281,609 | Walter | May 5, 1942 |
| 2,730,148 | Matarrese | Jan. 10, 1956 |
| 2,766,795 | Yoerger | Oct. 16, 1956 |